United States Patent Office

3,407,181
Patented Oct. 22, 1968

3,407,181
α-METHYL-α-DICHLOROPHENYL-β-PROPIOLAC-
TONES AND POLYMERS THEREOF
Roger C. Kierstead, Kynlyn, Wilmington, Del., assignor
to E. I. du Pont de Nemours and Company, Wilmington, Del., a corporation of Delaware
No Drawing. Filed Apr. 23, 1965, Ser. No. 450,513
5 Claims. (Cl. 260—78.3)

ABSTRACT OF THE DISCLOSURE

Treatment of α-phenyl-β-chloroisobutyric acid with chlorine at 0 to 75° C. in the presence of a chlorination catalyst to form a chlorinated acid, dissolving the thus formed acid in an aqueous base to give a salt solution of pH 7 to 10 and heating the salt thus formed to convert said salt to either α-(3,5-dichlorophenyl)-α-methyl-β-propiolactone or α - (3,4-dichlorophenyl) - α-methyl-β-propiolactone, and polymerizing either of these lactones at from 20 to 200° C. with any of alkali metal carboxylates, tertiary phosphine, tertiary amine, alkali metal alkoxide, quarternary ammonium hydroxide, quarternary ammonium alkoxide or quarternary ammonium carboxylate catalysts to form a polymer having an inherent viscosity of at least 0.75 as measured as a 0.5% solution in N-methyl pyrrolidone.

---

This invention relates to α-methyl-α-dichlorophenyl-β-propiolactones, polymers derived therefrom and the synthesis of these lactones and their polymers.

The polymers produced from the α-methyl-α-dichlorophenyl-β-propiolactones of this invention have high heat distortion temperatures, good weather resistance, and excellent clarity. Hence, these polymers are particularly useful as high temperature luminairs, plastic glazing, interlayers for thermopane and for making fibers.

Unchlorinated lactones such as α-methyl-α-phenyl-β-propiolactone and the polymers formed therefrom are disclosed in French Patent No. 1,231,163 and German Patent No. 1,174,305. The polymers produced from these lactones do not have the high softening point, excellent solvent resistance, and nonflammability exhibited by the α-methyl-α-dichlorophenyl-β-propiolactone polymers of the present invention.

The most readily available starting material for forming the lactones of this invention is α-methyl styrene. Alpha-methyl styrene is treated with hypochlorous acid at from −15° to +15° C. in aqueous acid solution to form 1-chloro-2-phenylpropanol-2. The chlorohydrin is then carbonylated by treating with a 2:1 to 50:1 molar excess of HF, or a HF/BF$_3$ mixture containing up to 10 mole percent BF$_3$ as based on the HF, under a pressure of from 200 to 1000 atmospheres of carbon monoxide at from −50° to +30° C. to form α-phenyl-β-chloroisobutyric acid. This reaction takes from 15 to 180 minutes. At the end of the reaction, at least a molar equivalent of water is added to hydrolyze by-product acid fluoride.

The α-phenyl-β-chloroisobutyric acid is then treated with chlorine in the dark to prevent side chain chlorination in the presence of a chlorination catalyst such as ferric chloride, or combinations of ferric chloride with aluminum chloride or stanic chloride. The catalytic addition of chlorine is preferably carried out at from 0° C. to 75° C. in an inert diluent such as carbon tetrachloride, methylene chloride or ethylene dichloride, and generally takes from 10 minutes to 24 hours. The chlorination reaction generally produces a mixture of about equal amounts of α-(3,4-dichlorophenyl)-β-chloroisobutyric acid and α-(3,5-dichlorophenyl)-β-chloroisobutyric acid. Other α-dichlorophenyl-β-chloroisobutyric acids are produced by modification of temperature, solvent and catalyst.

The α-dichlorinated phenyl-β-chloroisobutyric acids are then converted to the corresponding lactones by a base catalyzed reaction. Generally, the reaction involves dissolving the acid in water, containing 100 to 125 mole percent of an alkali, alkaline earth, or ammonium hydroxide based on the acid used and sufficient buffer such as CO$_2$, to maintain the pH of the solution at from 7 to 10. A sufficient organic solvent such as benzene, chloroform, or tetrachloroethylene, should also be present to dissolve the lactone as it is formed. The reaction occurs without the presence of the organic solvent but the base can cause polymerization of the lactone and thereby reduce the yield obtained. The reaction is preferably carried out at from 40° to 100° C. and generally takes from 10 to 60 minutes. This process is more fully described in U.S. patent application, SN 417,011 filed December 9, 1964, now Patent No. 3,291,810 by Carl Edward Lorenz.

The α-dichlorinated phenyl-α-methyl-β-propiolactone is readily polymerized in the presence of a catalyst such as alkali metal carboxylates, tertiary phosphines, tertiary amines, alkali metal alkoxides, quaternary ammonium hydroxides, alkoxides, and carboxylates. These include potassium stearate, triphenyl phosphine, potassium pivalate, triethylamine, sodium methoxide, triethylene diamine, and tetra-(n-butyl)-ammonium hydroxide. The polymerization is carried out at from 20° to 200° C. The pressure is not critical and need only be sufficient to maintain the monomer in the liquid phase at the temperature being used. The upper pressure limit is imposed only by the apparatus being used and may be as high as 500 atmospheres if desired. Polymerization may take from 2 minutes to 24 hours depending upon the conditions being used. Preferably, the polymer produced has an inherent viscosity of at least 0.75 as determined from a 0.5 weight percent solution in N-methyl pyrrolidone. If the polymer is insoluble in N-methyl pyrrolidone due to too high a molecular weight, the inherent viscosity is considered to be above 0.75. This process can also be used to form copolymers of α-(3,4-dichlorophenyl) - α-methyl - β-propiolactone or α - (3,5-dichlorophenyl) - α - methyl - β-propiolactone with other α-disubstituted-β-propiolactones such as α,α-dimethyl-β-propiolactone, α-methyl - α-phenyl-β - propiolactone, α - methyl-α-monochlorophenyl, α,α - diethyl - β-propiolactone, or α-methyl-α-chloromethyl-β-propiolactone.

The following examples are illustrative of the invention.

Example I

In a 3 liter, 3 neck flask, equipped with a dropping funnel, a mechanical stirrer, and a thermometer are placed 177.3 g. (1.5 moles) of α-methyl styrene and 90 g. (1.5 moles) of glacial acetic acid. To this mixture 2.125 liter of 5.25 percent aqueous NaOCl is added dropwise with vigorous stirring, while keeping the internal temperature at 0° C. After stirring an additional 30 minutes at 0° C., the reaction mixture is extracted with three 150 ml. portions of diethyl ether and the ethereal extracts washed four times with water, then with saturated aqueous sodium chloride and dried over sodium sulfate. Removal of solvent by evaporation and distillation of the residue affords 164.9 g. (0.965 mole) of the chlorohydrin (1-chloro-2-phenylpropanol-2), boiling point 83–85° C./2 mm. Hg, a 75 percent yield at 86 percent conversion.

Example II

A 325 ml. stainless steel shaker tube is charged with 50 ml. (0.293 mole) 1-chloro-2-phenylpropanol-2 and cooled to −30° C., whereupon 100 g. HF and 7 g. BF$_3$ are added and shaking begun. The shaker tube is then pressured to 600 atmospheres with CO, allowed to warm to −10° C., with a concomitant CO pressure of 625 atmospheres, and maintained at −10° C. for 1 hour. After this time, 20 ml. of water is injected, and the shaker tube is allowed to warm to 20° C., with continued shaking over a period of 2 hours. After slowly venting the CO, the contents of the tube are discharged onto excess ice and the resulting aqueous mixture extracted three times with 50 ml. portions of methylene chloride and the aqueous layer separated. The extracts are combined, washed with water and then stirred in an ice bath with 250 ml. saturated aqueous $NaHCO_3$ for 90 minutes. The layers are separated and the aqueous layer, after acidification with concentrated HCl, is extracted with two 100 ml. portions of diethyl ether. The ether extracts are washed with water and with saturated aqueous sodium chloride and dried over sodium sulfate. The ether extracts are then concentrated by evaporation of the ether whereupon the crude acid solidified. Crystallization of this solid from methylene chloride-petroleum ether mixture affords 30.2 (0.152 mole) α-phenyl-β-chloroisobutyric acid, melting point 70–72° C., a 52 percent yield.

Example III

A solution of 25 g. (0.126 mole) α-phenyl-β-chloroisobutyric acid in 600 ml. of carbon tetrachloride, in a 1 liter three neck round bottom flask, fitted with a gas dispersion tube, a mechanical stirrer, and a Dry Ice-acetone condenser, is cooled to 0° C. and charged with 61.5 g. (0.38 mole) of ferric chloride all at once. After stirring the solution for 1 hour at 25° C., 40.1 g. (0.567 mole) chlorine is passed into the reaction mixture, in the dark, over a period of 2 hours followed by stirring for 16 hours. The reaction flask is cooled in an ice bath and 200 ml. of aqueous 5 percent HCl is added. The layers are then separated and the organic layer washed with water and saturated aqueous sodium chloride, and then dried over sodium sulfate. A solid is obtained by evaporation of the solvent. The solid is recrystallized from acetone to give 8.71 g. of α-(3,5-dichlorophenyl)-β-chloroisobutyric acid, melting point 207–209° C. The structure is assigned on the basis of the elemental analyses, IR and NMR spectra. The solid obtained from the mother liquors is recrystallized from acetone to give 3.15 g., melting point 180–190° C. of a mixture of about equal molar portions of α-(3,5-dichlorophenyl)-β-chloroisobutyric acid and α-(3,4-dichlorophenyl)-β-chloroisobutyric acid. Repeated recrystallization of the remaining material from 50/50 acetone-petroleum ether mixture gave 13.85 g., M.P. 104–110° C., of α-(3,4-dichlorophenyl)-β-chloroisobutyric acid. The yield of isolated and purified α-(3,5-dichlorophenyl)-β-chloroisobutyric acid was 25.8 percent and of isolated and purified α - (3,4-dichlorophenyl)-β-chlorophenyl-β-chloroisobutyric acid was 47.1 percent.

Example IV

To a stirred suspension of 8.52 g. α-(3,5-dichlorophenyl)-β-chloroisobutyric acid in 100 ml. of water is added dropwise 39 ml. of 0.9 M aqueous sodium hydroxide, followed by 15 minutes additional stirring. The pH of the system is adjusted to eight with solid $CO_2$. One hundred ml. benzene is added, and the solution is heated to and maintained at 65° C. for 30 minutes. The solution is cooled quickly to 10° C., the layers separated, and the aqueous layer extracted twice with 50 ml. portions of diethyl ether. The organic extracts are combined, washed with water and with saturated aqueous sodium chloride, and dried over sodium sulfate. Upon removal of solvent by evaporation an oil is obtained which solidified on trituration with ether-petroleum ether. Recrystallization of the white solid thus formed from 50/50 ether-petroleum ether mixture afforded 4.79 g. (57.5 percent yield) of α-(3,5-dichlorophenyl)-α-methyl-β-propiolactone (melting point 57.5 to 58.5° C.).

Example V

To a stirred suspension of 12.04 g. (0.045 mole) α-3,4-dichlorophenyl)-β-chloroisobutyric acid in 150 ml. of water is added 19.9 ml. of 2.5 M aqueous sodium hydroxide, followed by 30 minutes stirring during which time the solution becomes homogeneous. The temperature of the solution was maintained at 20° C. during this time. The pH of the solution is adjusted to eight with solid $CO_2$, 150 ml. benzene is added and the solution is heated to 65° C. for 30 minutes. The solution is cooled to 10° C. and the layers which have formed are separated. The aqueous layer is extracted twice with 50 ml. portions of diethyl ether. The organic extracts are combined with the original organic layer and then washed with water and saturated aqueous sodium chloride and dried over sodium sulfate. The solvent is removed by evaporation to yield 10 g. of crude oily lactone which solidified on cooling to room temperature. Crystallization of the solid from diethyl ether-petroleum ether mixture 7.1 g. (0.0307 mole) of colorless, crystalline α-(3,4-dichlorophenyl)-β-propiolactone, melting point 87–89° C., in 71.2 percent yield.

Example VI

A solution of 0.0005 g. triphenyl phosphine (0.03 weight percent) and 0.0002 g. "Tinuvin" P [2-(2-hydroxy-5-methyl phenyl)benzotriazole], in 1.5 g. α-(3,5-dichlorophenyl)-α-methyl-β-propiolactone is heated under a nitrogen atmosphere in a stoppered test tube at 100° C. for 16 hours. The gel point is attained in 45 minutes. The polymer is obtained as a clear, colorless, hard plug that was insoluble in a wide variety of solvents including N-methyl pyrrolidone because of its very high molecular weight. The polymer had a Vicat softening point of 168° C. This material, without further treatment, is placed in an Atlas "Weather-Ometer," model X–W. After 343 hours, the polymer yellows very slightly. No further yellowing or deterioration is observed even after 3,000 hours in the "Weather-Ometer."

A second sample of the polymer, prepared as in Example VI, except without the "Tinuvin" P stabilizer, yellows more noticeably after 38 hours in the "Weather-Ometer," but no more yellowing or deterioration develops during the next 2,000 hours.

A third sample of the polymer, prepared as in Example VI, but using 1.1 weight percent triphenyl phosphine exhibits an inherent viscosity of 1.26 as measured in 0.5 percent solution in N-methyl pyrrolidone.

Example VI is repeated except without the "Tinuvin" P stabilizer, using on separate runs, 0.5 weight percent based on the monomer of each of sodium methoxide, triethylene diamine and tetra-(n-butyl)-ammonium hydroxide and a polymer having an inherent viscosity above 0.75 as measured from a 0.5 percent solution in N-methyl pyrrolidone is obtained.

Example VII

A solution of 0.0005 g. of potassium pivalate and 0.0005 g. of "Tinuvin" P in 1.0 g. α-(3,5-dichlorophenyl)-α-methyl-β-propiolactone is heated under a nitrogen atmosphere in a stoppered test tube at 100° C. for 16 hours. The gel point is reached after 2 hours. The resulting clear, colorless, polymer plug yellows slightly after 360 hours in the "Weather-Ometer" but no further deterioration is apparent after a total of 2,000 hours.

A second sample of the polymer, prepared as in Example VII, except without the "Tinuvin" P inhibitor, yellows more noticeably after 38 hours in the "Weather-Ometer," but no more yellowing or deterioration develops after 2,000 hours.

Example IX

A solid mixture of 0.9282 g. α-(3,4-dichlorophenyl)-α-methyl-β-propiolactone and 0.0002 g. triphenylphosphine is heated under a nitrogen atmosphere in a stoppered test tube for 30 minutes during which time the temperature rises from 25 to 110° C. The lactone (melting point 89° C.) started to polymerize before it had melted completely resulting in a bubbled polymer plug. The temperature is maintained at 110° C. for an additional 16 hours to give a clear, colorless plug with some holes. A film of the polymer is pressed at 200° C. under 1,000 p.s.i. pressure. The polymer has an inherent viscosity of 2.28 as determined from a 0.5 percent solution in trichloroethylene at 30° C. The glass transition temperature of this polymer is 75° C. as measured by Differential Thermal Analysis.

Example X

A liquid solution of 0.5 g. α-(3,4-dichlorophenyl)-α-methyl-β-propiolactone and 0.5 g. α-(3,5-dichlorophenyl)-α-methyl-β-propiolactone is treated with 0.0002 g. triphenyl phosphine and heated under nitrogen in a stoppered test tube at 95° C. Within 3 minutes polymerization proceeds rapidly giving a gel in less than 5 minutes. Heating at 95° C. is continued for 16 hours to give a hard, clear, colorless polymer plug. The polymer has an inherent viscosity of 2.30 as determined from a 0.5 percent solution in nitrobenzene at 50° C. The polymer shows glass transition temperatures of 80° C. and 111° C. as determined by Differential Thermal Analysis.

Example XI

A homogeneous liquid solution of 2.5 g. each of α-(3,4-dichlorophenyl)-α-methyl-β-propiolactone and α-(3,5-dichlorophenyl)-α-methyl-β-propiolactone is treated with 0.0004 g. triphenyl phosphine and heated at 75° C. for 16 hours (18 minute gel point). The resulting polymer is clear and colorless. The Vicat softening temperature of the polymer is found to be 90° C.

I claim:
1. α-(3,4-dichlorophenyl)-α-methyl-β-propiolactone.
2. α-(3,5-dichlorophenyl)-α-methyl-β-propiolactone.
3. A polymer of a compound selected from the class consisting of α-(3,4-dichlorophenyl)-α-methyl-β-propiolactone and α-(3,5-dichlorophenyl)-α-methyl-β-propiolactone having an inherent viscosity of at least 0.75 as measured from a 0.5 percent solution in N-methyl pyrrolidone.
4. Poly-α-(3,4-dichlorophenyl)-α-methyl-β-propiolactone having an inherent viscosity of at least 0.75 as measured from a 0.5 percent solution in N-methyl pyrrolidone.
5. Poly-α-(3,5-dichlorophenyl)-α-methyl-β-propiolactone having an inherent viscosity of at least 0.75 as measured from a 0.5 percent solution in N-methyl pyrrolidone.

References Cited

UNITED STATES PATENTS 3,268,486  8/1966  Klootwijk _____ 260—78.3
3,326,938  6/1967  Wagner _____ 260—343.9

OTHER REFERENCES

"Organic Chemistry" by Morrison et al., copyright 1959, Allyn and Bacon, Inc., pp. 264–265.

WILLIAM H. SHORT, *Primary Examiner.*

R. T. LYON, *Assistant Examiner.*